(12) United States Patent
Deiss et al.

(10) Patent No.: US 7,275,512 B2
(45) Date of Patent: Oct. 2, 2007

(54) AIR INTAKE DEVICE

(75) Inventors: Siegfried Deiss, Mötzing (DE); Peter Fischer, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 167 days.

(21) Appl. No.: 10/536,925

(22) PCT Filed: Aug. 6, 2003

(86) PCT No.: PCT/DE03/02644

§ 371 (c)(1),
(2), (4) Date: Jun. 27, 2005

(87) PCT Pub. No.: WO2004/031567

PCT Pub. Date: Apr. 15, 2004

(65) Prior Publication Data

US 2006/0249114 A1    Nov. 9, 2006

(30) Foreign Application Priority Data

Sep. 27, 2002  (DE) ................................ 102 45 110

(51) Int. Cl.
*F02M 35/10* (2006.01)
*F02B 27/02* (2006.01)
(52) U.S. Cl. ................................ 123/184.55
(58) Field of Classification Search ........... 123/184.55, 123/184.21, 184.53, 184.56
See application file for complete search history.

(56) References Cited

U.S. PATENT DOCUMENTS

| 5,143,026 A | 9/1992 | Brüstle et al. |
| 5,762,036 A | 6/1998 | Verkleeren |
| 6,032,634 A | 3/2000 | Minegishi et al. |
| 6,408,810 B1 * | 6/2002 | Leipelt et al. ......... 123/184.55 |
| 6,983,727 B2 * | 1/2006 | Narayanaswamy .... 123/184.55 |

FOREIGN PATENT DOCUMENTS

| DE | 197 28 600 A1 | 1/1999 |
| EP | 0 569 714 A1 | 11/1993 |
| EP | 1 256 703 A3 * | 6/2003 |
| WO | 93/00505 | 1/1993 |

OTHER PUBLICATIONS

"Manifold (automotive engineering)." Wikipedia, The Free Encyclopedia. Jan. 28, 2007, 09:38 UTC. Wikimedia Foundation, Inc. Feb. 1, 2007 <http://en.wikipedia.org/w/index.php?title=Manifold_%28automotive_engineering%29&oldid=103804967>.*

* cited by examiner

*Primary Examiner*—Stephen K. Cronin
*Assistant Examiner*—Ka Chun Leung
(74) *Attorney, Agent, or Firm*—Laurence A. Greenberg; Werner H. Stemer; Ralph E. Locher

(57) ABSTRACT

The invention relates to a suction device for an internal combustion engine provided with a first manifold (1) having a slot (3). A first suction line (5) is extended from an input orifice (7) which enters the first manifold (1) to an output orifice (9) which connects the first suction line (5) to the suction line of a cylinder head of the internal combustion engine. The inventive device also comprises a second suction line (11) and a second manifold (13) provided with a second slot (15) which are orientable and interconnectable. When the second suction line is in the first pivoting position, intake air passes through the first slot (3) to the first manifold (1) and afterwards, flows to the first suction line (5). When the second suction line is in a second pivoting position, the first and second slots (3, 15) are hermetically connected to each other in such a way that intake air passes through the first slot (3) and directly through the second slot (15) in order to enter the second manifold (13) and afterwards, to flow to the first suction line (5) crossing the second suction line (11).

2 Claims, 3 Drawing Sheets

AIR INTAKE DEVICE

BACKGROUND OF THE INVENTION

Field of the Invention

The invention relates to an air intake device, in particular for an internal combustion engine, which is switchable in its effective intake tube length.

An air intake device for internal combustion engines having a collection manifold and intake lines branching off separately to the individual cylinders of the internal combustion engine is known from DE 199 51 083 A1. The intake lines disclosed therein extend into the collection manifold. To each of the intake lines there are assigned first and second intake tube segments which can be swiveled about a rotary axis independently of each other in such a way that in a first position the effective intake tube length, that is to say the area through which the inducted air flows toward the cylinder from the collection manifold, is only the intake line, in a second position the effective intake tube length is that of the intake line and the first intake tube segment, and in a third position the effective intake tube length is the length of the intake line and the first and second intake tube segment.

The object of the invention is to further improve the known air intake device.

SUMMARY OF THE INVENTION

The object is achieved by the features of the independent claim. Advantageous embodiments of the invention are characterized in the dependent claims. The subject matter of the independent claim is characterized in that a very high air delivery rate can be achieved over wide speed ranges and that a very good engine response, e.g. for idle stabilization, is made possible.

BRIEF DESCRIPTION OF THE DRAWING

Exemplary embodiments of the invention are explained with reference to the schematic drawings, in which.

DESCRIPTION OF THE EMBODIMENTS

Figure 1:
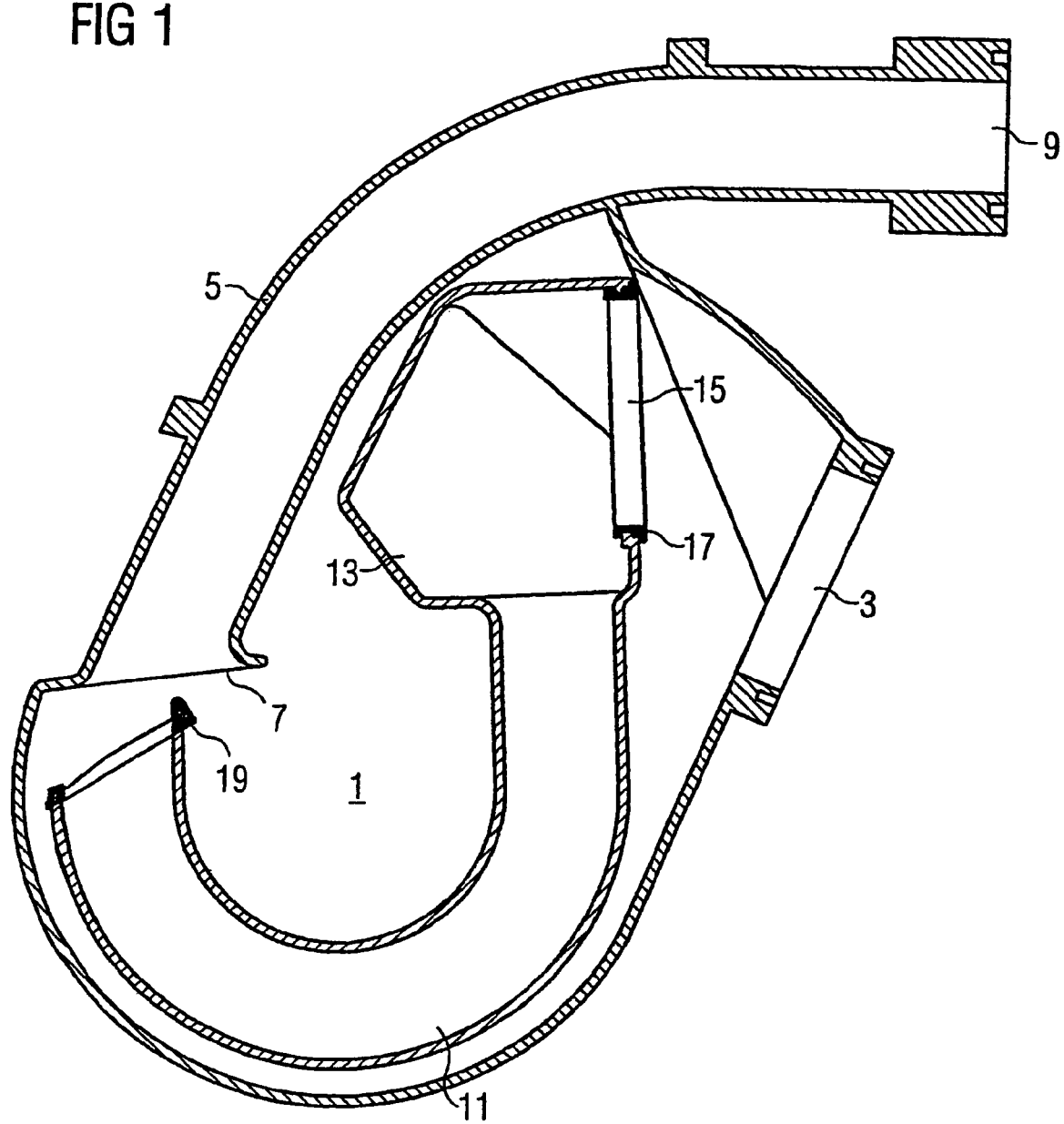
FIG. 1 shows a first embodiment of the air intake device in a power setting.

Elements of similar construction and function are represented by the same reference numerals throughout the Figs.

An air intake device which is preferably made of plastic has a first manifold 1 which has a first opening 3 in the area of a flange onto which, for example, a throttle housing or some other inlet housing or output of an air filter can be flanged and via which ambient air can then flow through the opening 3 into the first manifold. Also provided is a first induction duct 5 which is extended from an inlet opening 7 which enters the first manifold 1 to an outlet opening 9. The first induction duct 5 can communicate with an inlet duct of a cylinder head of an internal combustion engine via the outlet opening 9.

Also provided are a second induction duct 11 and a second manifold 13. The second manifold 13 has a second opening 15 and is coupled to the second induction duct 11. The second induction duct 11 and the second manifold 13 can be coupled to each other by means of, for example, a screw connection with a seal, but they can also be joined to each other by welding or by gluing or other types of joining. Preferably, however, the second manifold 13 and the second induction duct 11 are embodied as a single piece, i.e. integrally.

The second induction duct 11 and consequently also the second manifold 13 are pivotally mounted and can be swiveled by means of a drive (not shown) into a first and second pivoting position. A suitable drive for use in this case is preferably what is known as a switchable vacuum-controlled diaphragm box. However, any other drive known to the person skilled in the art, such as an electric motor, for example, can be provided.

When the second induction duct 11 is in a first pivoting position, the air to be inducted by the internal combustion engine flows through the first opening 3 into the first manifold 1 and from there into the first induction duct 5. It then flows further through the first induction duct 5 and out through the outlet opening 9. From there it flows out into an inlet duct of the cylinder head and finally into a cylinder of the internal combustion engine if the air intake device is flanged onto the cylinder head of an internal combustion engine.

When the second induction duct 11 is in a second pivoting position (FIG. 2), the air to be inducted by the internal combustion engine flows through the first opening 3 and directly on through the second opening 15 into the second manifold 13. From the second manifold 13 the air flows on through the second induction duct 11 and finally into the first induction duct 5 and through the latter to the outlet opening 9.

In the second pivoting position the first opening 3 and the second opening 15 are coupled to each other to form a sealed connection. In the present exemplary embodiment the first and second opening 3, 15 are in alignment with each other and sealed by means of a first gasket 17 in such a way that no air can flow through the first opening 3 and onward into the first manifold 1. However, the first and second outlet opening 3, 15 can also be dimensioned differently, the essential thing being only that in the second pivoting position of the second induction duct 11 the air flows directly from the first opening 3 into the second manifold 13.

In the second pivoting position the second induction duct 11 and the first induction duct 5 are also coupled to each other to form a sealed connection. This is ensured by a second gasket 19 which forms a seat in the second pivoting position in the area of the inlet opening 7.

With the present air intake device, the first manifold 1 can be dimensioned such that for the so-called "power position" which corresponds to the first pivoting position of the second induction duct 11 a suitably large manifold volume is available for the very high filling requirement. The second manifold 13 can be dimensioned independently thereof and is advantageously dimensioned such that it has a small volume compared to the first manifold, thus resulting in a very good engine response, e.g. for idle stabilization at low speeds.

Figure 2:
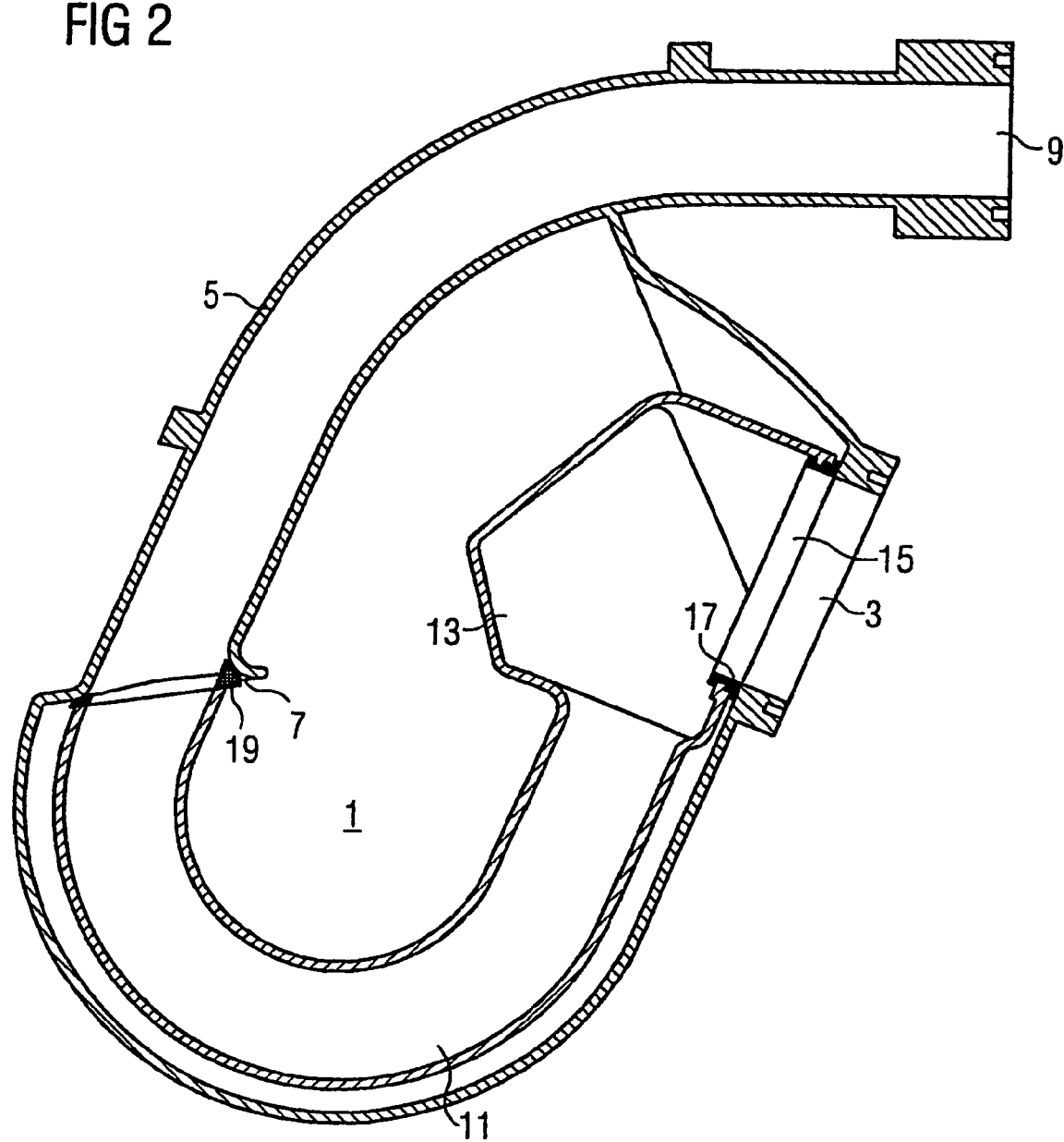
FIG. 2 shows the embodiment of the air intake device according to FIG. 1 in a torque setting.
Figure 3:
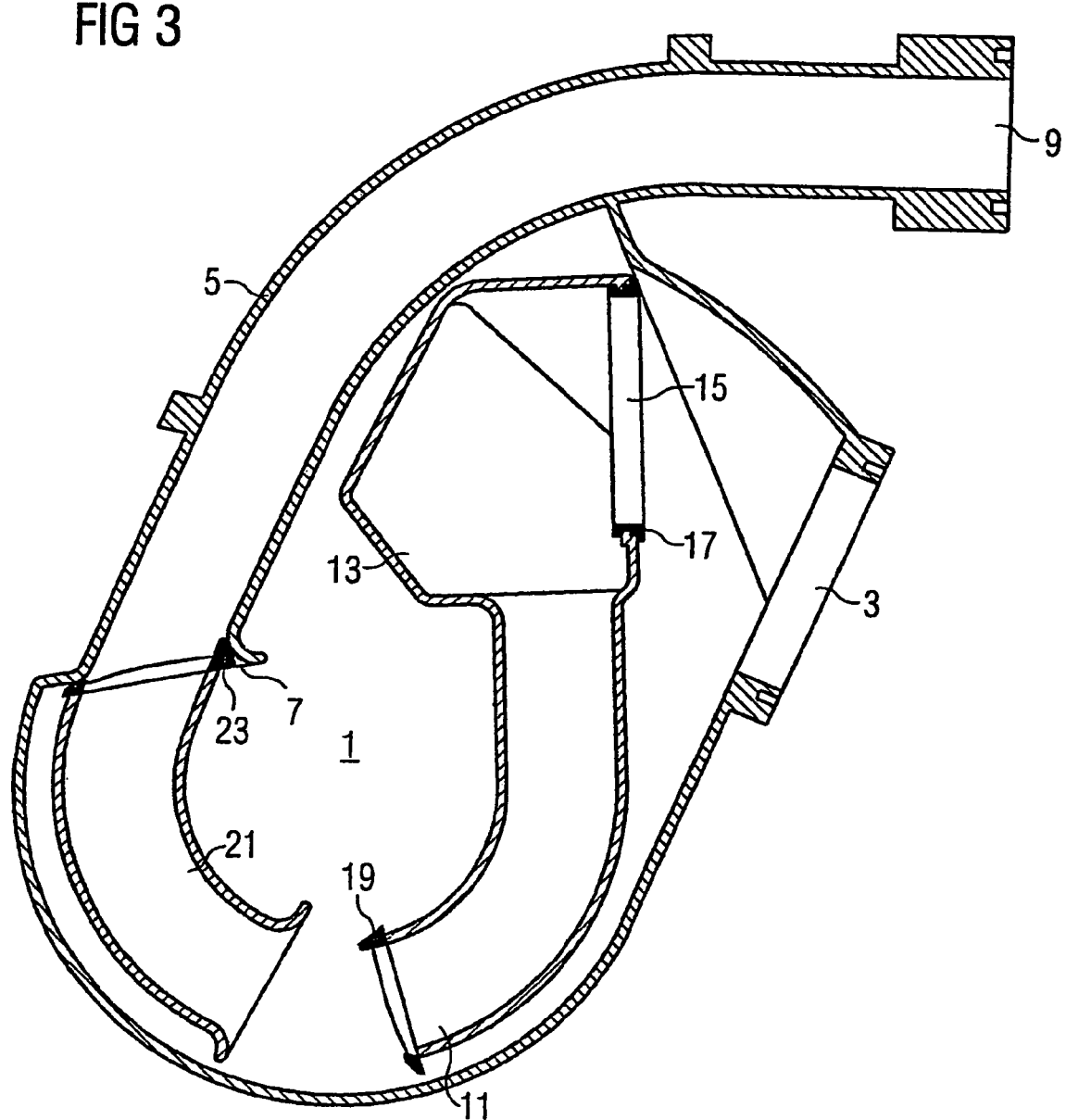
FIG. 3 shows a further embodiment of the air intake device.

FIG. 3 shows a further embodiment of the air intake device which differs from that according to FIGS. 1 and 2 in that a third induction duct 21 is provided in addition to the first induction duct 5 and the second induction duct 11. The third induction duct 21 is likewise pivotally mounted. With this embodiment the effective intake tube length can be varied in three stages: firstly, in the so-called power position, in which the air flows from the first manifold 1 directly into the first induction duct 5; secondly, in an intermediate position for medium speed ranges in which the air flows through the first manifold 1 into the third induction duct 21 and from there directly into the first induction duct 5. In this position the third induction duct 21 is then coupled to the first induction duct 5 so as to form a seal. For this purpose a gasket 23 is provided which forms a seat in the area of the inlet opening 7 of the first induction duct. At high speeds, in a third or in a further pivoting position, the first induction duct 5 is then coupled to the third induction duct 21 and the latter is in turn coupled to the second induction duct 11. In this pivoting position the first and second openinges are then once again coupled to each other so as to form a seal, with the result that the air flows through the second manifold 13 into the second induction duct 11 and from there into the third induction duct 21 and subsequently into the first induction duct 5.

In addition to the three induction ducts represented here further induction ducts can of course be provided, said induction ducts being embodied and arranged accordingly such that further effective intake tube lengths can be similarly implemented.

We claim:

1. An air intake device for an internal combustion engine, comprising:
    a first air chamber formed with a first opening for aspirating air into said first air chamber;
    a first induction duct extending between an inlet opening leading into said first air chamber and an outlet opening through which said first induction duct communicates with an inlet duct of a cylinder head of the internal combustion engine;
    a second induction duct;
    a second air chamber formed with a second opening, said second air chamber being coupled to said second induction duct and being pivotally mounted together with said second induction duct into a first pivot position in which said first air chamber communicates with said first opening and into a second pivot position in which said second opening communicates to aspirate air from said first opening and substantially closes said first opening relative to said first air chamber;

wherein:
    in the first pivot position of said second induction duct, air to be inducted by the internal combustion engine flows through said first opening into said first air chamber and into said first induction duct; and
    in the second pivot position of said second induction duct, said first opening and said second opening are coupled to each other and form a seal, air to be inducted flows through said first opening and directly through said second opening into said second air chamber, and through said second induction duct into said first induction duct.

2. The air intake device according to claim 1, which further comprises a third induction duct, and wherein, in the first pivot position of said second induction duct, the air to be inducted either flows from said first air chamber directly into said first induction duct or flows from said first air chamber through said third induction duct into said first induction duct, and, in the second pivot position, the air flows through said second induction duct, through said third Induction duct, and subsequently through said first induction duct.

* * * * *